United States Patent [19]
Shibayama et al.

[11] Patent Number: 5,335,537
[45] Date of Patent: Aug. 9, 1994

[54] METHOD OF INSPECTING LIMITED SLIP DIFFERENTIAL FOR VEHICLE

[75] Inventors: Takao Shibayama; Keiichiro Maekawa; Akihito Fukutome; Yoshiharu Nakazono; Yoshimichi Matsumoto, all of Sayama, Japan

[73] Assignee: Honda Giken Kogyo Kabushiki Kaisha, Tokyo, Japan

[21] Appl. No.: 942,190

[22] Filed: Sep. 9, 1992

[30] Foreign Application Priority Data

Sep. 19, 1991 [JP] Japan ................................. 3-239841
Aug. 21, 1992 [JP] Japan ................................. 4-223083

[51] Int. Cl.⁵ ........................................................ G01M 15/00
[52] U.S. Cl. ................................................................. 73/117
[58] Field of Search ........................ 73/118.1, 162, 117

[56] References Cited

U.S. PATENT DOCUMENTS 4,848,142 7/1989 Fujimori et al. .

FOREIGN PATENT DOCUMENTS 63-84544  2/1988 Japan .
1-191031  1/1989 Japan .
1159715  10/1966 United Kingdom .
2211312A 10/1988 United Kingdom .

*Primary Examiner*—Robert Raevis
*Attorney, Agent, or Firm*—Armstrong, Westerman, Hattori, McLeland & Naughton

[57] ABSTRACT

A limited slip differential which is incorporated into a differential gear for driving one wheel and the other wheel of a vehicle is inspected as follows. One wheel and the other wheel are mounted on one roll and on another roll, respectively. Acceleration of the vehicle is performed while the aforementioned one roll on which the aforementioned one wheel is mounted is being subjected to a force of restraining the rotation of the aforementioned one roll. A difference in rotational speed between the aforementioned one roll and the aforementioned another roll on which the other wheel is mounted is measured during the accelerating operation. A torque which operates on the aforementioned one roll is measured. A limited slip differential torque which is generated by the limited slip differential is measured from the measured torque. That standard value of the limited slip differential torque which is generated at the measured difference in rotational speed and the obtained limited slip differential torque are compared to judge whether the limited slip differential is acceptable or not.

7 Claims, 2 Drawing Sheets

METHOD OF INSPECTING LIMITED SLIP DIFFERENTIAL FOR VEHICLE

BACKGROUND OF THE INVENTION

The present invention relates to a method of inspecting a limited slip differential (or differential limiting-device) which functions to limit or restrict a differential movement between the right wheel and the left wheel of a vehicle or a differential movement between the front wheels and the rear wheels of a four-wheel drive vehicle.

As can be seen in Japanese Published Unexamined Utility Model Registration Application No. 84544/1988, there is known a method of inspecting a limited slip differential in which: one wheel and the other wheel of a vehicle, differential movement therebetween being limited, are respectively mounted on rolls; accelerating operation of the vehicle, i.e., depressing of an accelerator pedal is performed under a condition in which a flywheel is connected to that one of the rolls on which said one wheel is mounted, said flywheel restraining the rotation of said one roll; a difference in rotational speed between said one roll and said the other roll on which said the other wheel is mounted is measured at the time of this accelerating operation; and the limited slip differential is judged to be unacceptable if the measured difference in rotational speed is above a predetermined value.

In the above-described method, it is possible to judge only as to whether the limited slip differential has operated or not, and there cannot be obtained a judgement on the acceptability or unacceptability of the operating conditions of the limited slip differential, i.e., a judgement as to whether it has operated according to its predetermined operating characteristics or not. In addition, since the difference in rotational speed between both rolls varies with the degree of acceleration, there are possibilities that the following may occur. Namely, at the time of sudden acceleration, even if the limited slip differential is normal, the difference in rotational speed between both rolls may exceed a predetermined value or, on the other hand, at the time of gradual or gentle acceleration, even if the limited slip differential is abnormal, the difference in rotational speed may lie below a predetermined value. There is, therefore, a disadvantage in that this kind of occurrence results in lack of reliability of inspection.

In view of the above-described disadvantages, the present invention has an object of providing a method in which the operating conditions of the limited slip differential can be accurately judged regardless of the degree of acceleration.

OBJECT AND SUMMARY OF THE INVENTION

According to one aspect of the present invention, the above-described and other objects are attained by a method of inspecting a limited slip differential which is incorporated into a differential gear for driving one wheel and the other wheel of a vehicle, the method comprising the steps of: mounting said one wheel on one roll and said the other wheel on another roll, respectively; accelerating the vehicle while said one roll on which said one wheel is mounted is being subjected to a force of restraining the rotation of said one roll; measuring, during the accelerating step, a difference in rotational speed between said one roll and said another roll on which said the other wheel is mounted; measuring a torque which operates on said one roll; obtaining from the measured torque a limited slip differential torque which is generated by the limited slip differential; and comparing a standard torque value of the limited slip differential torque, which is generated at the measured difference in rotational speed, and the obtained limited slip differential torque, whereby a judgement is made whether the limited slip differential is acceptable or not.

According to another aspect of the present invention, the above-described and other objects are attained by a method of inspecting a limited slip differential such as a viscous coupling or the like which is provided between front wheels and rear wheels of a four-wheel drive vehicle, the method comprising the steps of: mounting the front wheels and the rear wheels on one roll and on another roll, respectively; accelerating the vehicle while said one roll on which either the front wheels or the rear wheels are mounted is being subjected to a force of restraining the rotation of said one roll; measuring, during the accelerating step, a difference in rotational speed between said one roll and said another roll on which the remaining of the front wheels and the rear wheels are mounted; measuring a torque which operates on said one roll; obtaining from the measured torque a torque ratio between a transmission torque to be transmitted to either the front wheels or the rear wheels and a transmission torque to be transmitted to the remaining of the front wheels and the rear wheels; and comparing a standard value of torque ratio, which is generated at the measured difference in rotational speed, and the obtained torque ratio, whereby a judgement is made whether the limited slip differential is acceptable or not.

If the limited slip differential which is incorporated into the differential gear operates normally, a limited slip differential torque (i.e., a torque due to the limited slip differential) is generated depending on the difference in rotational speed between said one wheel and said the other wheel. Let a torque to be distributed by the differential gear between said one wheel and said the other wheel be Ta, and the limited slip differential torque be To. The torque $T_1$ to be transmitted to said one wheel which is mounted on said one roll whose rotation is restrained will be Ta+To, and the torque $T_2$ to be transmitted to said the other wheel will be Ta−To. The torque $T_1$ to be transmitted to said one wheel operates on said one roll via said one wheel. The torque T to operate on said one roll becomes equal to $T_1$ until said one roll starts to rotate against the force of restraining the rotation. Therefore, if the value Ta is known, the value To can be obtained by T−Ta.

Here, the value Ta is one-half of that output torque of a transmission which is input to the differential gear. In a vehicle having mounted thereon a torque sensor for detecting this output torque, the value Ta can be detected by picking up a signal of the torque sensor. It follows that the value To, i.e., the limited slip differential torque can be obtained from the measured value T of the torque to operate on said one roll.

Further, if the transmission torque $T_2$ (=Ta −To) to be transmitted to said the other wheel is deducted from T (=Ta+To), the result will be 2To. Therefore, the value To can be obtained if the value $T_2$ is known. Here, since the value $T_2$ operates as an accelerating force to accelerate the rotation of said the other wheel together with said another wheel on which said the other roll is mounted, the value $T_2$ can be computed by measuring the acceleration of said another roll and then multiplying, by this acceleration, the moment of inertia of said the other wheel inclusive of said another roll. Hence, the value To can be obtained from T and $T_2$.

Even if the limited slip differential torque is obtained as described above, the difference in rotational speed varies with the degree of acceleration and, therefore, this limited slip differential torque alone cannot be the basis for judging whether the limited slip differential has operated normally or not in accordance with predetermined operating characteristics. However, in the present invention, the difference in rotational speed of the rolls is also measured, and a comparison is made between that standard value of the limited slip differential torque which is generated at this difference in rotational speed and the limited slip differential torque. Therefore, it can be judged whether the limited slip differential has operated normally or not, irrespective of the degree of acceleration.

The limited slip differential such as a viscous coupling which is provided between the front wheels and the rear wheels functions to transmit a torque to the wheels of lower speed when there occurs a difference in rotational speed between the front wheels and the rear wheels. If the limited slip differential functions normally, the torque ratio between the torque to be transmitted to either the front wheels and the rear wheels which are mounted on said one roll whose rotation is restrained and the torque to be transmitted to the remaining wheels will become a predetermined value which corresponds to the difference in rotational speed between the front wheels and the rear wheels.

The transmission torque to be transmitted to one set of wheels, i.e., either the front wheels or the rear wheels is equal to the torque T to operate on one of the rolls. The transmission torque to be transmitted to the remaining set of wheels of the front wheels and the rear wheels can be calculated by multiplying, by the acceleration of the other of the rolls, the moment of inertia of the remaining set of wheels inclusive of the other of the rolls. From these values the torque ratio can be obtained. In a vehicle having mounted thereon a torque sensor for detecting an output torque of a transmission, the torque ratio can be obtained by computing the transmission torque to the other set of wheels by deducting T from the output torque.

Then, by comparing that standard value of the torque ratio which is generated at the measured difference in rotational speed and the obtained torque ratio, it becomes possible to judge whether the limited slip differential has operated normally or not, irrespective of the degree of acceleration.

BRIEF DESCRIPTION OF THE DRAWINGS

The above and other objects and attendant advantages of the present invention will become readily apparent by reference to the following detailed description when considered in conjunction with the accompanying drawings wherein.

DETAILED DESCRIPTION OF A PREFERRED EMBODIMENT

Figure 1:
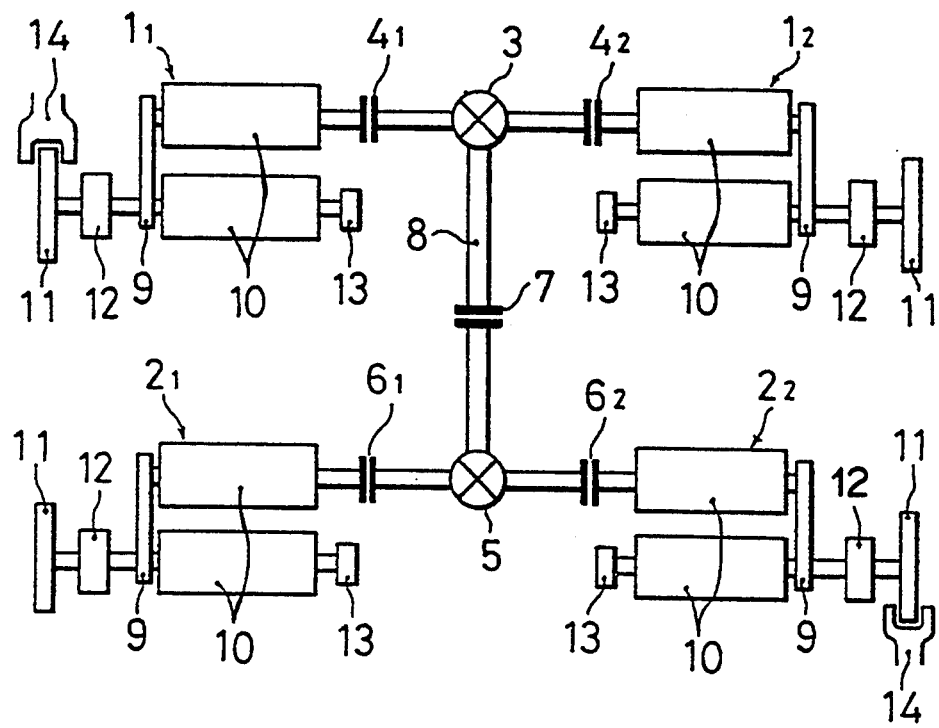
FIG. 1 is a plan view of one example of an inspection apparatus to be used in carrying out the present invention method.

FIG. 1 shows an apparatus which inspects a limited slip differential and is used in carrying out the method of the present invention. The apparatus has a pair of right and left rolls $1_1$, $1_2$ for front wheels and a pair of right and left rolls $2_1$, $2_2$ for rear wheels. The rolls $1_1$, $1_2$ for the front wheels are connected, via a respective clutch $4_1$, $4_2$, to a gear box 3 which is disposed between the two rolls $1_1$, $1_2$. The rolls $2_1$, $2_2$ for the rear wheels are also connected, via a respective clutch $6_1$, $6_2$, to a gear box 5 which is disposed between the two rolls $2_1$, $2_2$. Further, the front gear box 3 and the rear gear box 5 are connected together via a connecting shaft 8 which has interposed therein a clutch 7. It is thus so arranged that, when the driving wheels of a two-wheel drive vehicle are rotated, the driven wheels are rotated via the connecting shaft 8 so that such works as an inspection of a driven wheel brake or the like can be performed.

Figure 2:
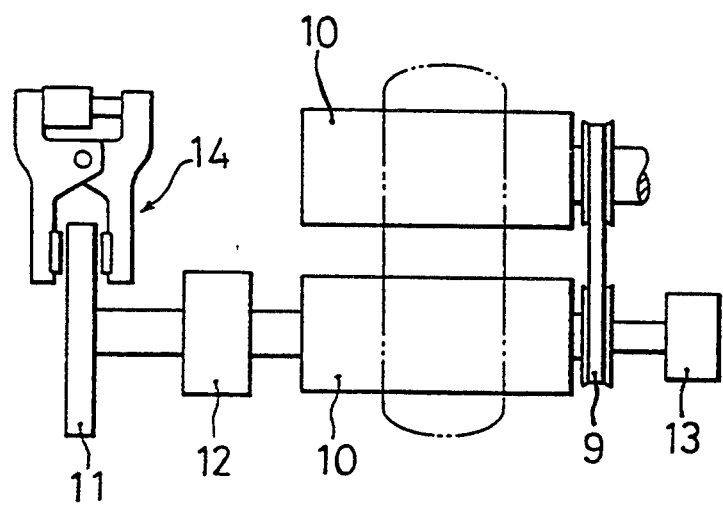
FIG. 2 is an enlarged plan view of a roll whose rotation is restrained.

Each of the above-described rolls is made up of a pair of front and rear split rolls 10, 10 which rotate synchronously via a belt 9. A flywheel 11 is connected to one of the split rolls 10, and a torque meter 12 is interposed between the two members 10, 11. A speedometer 13 for detecting the rotational speed of each of the split rolls 10 is also provided. In addition, a roll brake 14 for restraining the rotation of each roll by pinching the flywheel 11 is provided, as shown in FIG. 2; in one of the rolls $1_1$, $1_2$ for the front wheels, e.g., in the left-side roll $1_1$ and in one of the rolls $2_1$, $2_2$ for the rear wheels, e.g., in the right-side roll $2_2$. Detected signals from the torque meter 12 and the speedometer 13, respectively, for each roll are input to an unillustrated monitor apparatus.

An inspection of a limited slip differential to be incorporated into a differential gear which is provided between the right front wheel and the left front wheel of a front-wheel drive vehicle is performed in the following manner by using the inspection apparatus as constructed above. The clutches $4_1$, $4_2$ are disengaged to release the connection between the left and the right rolls $1_1$, $1_2$ for the front wheels. Further, the roll brake 14 for the roll $1_1$ for the left front wheel is operated. Under these conditions, an accelerator pedal is depressed to perform an accelerating operation.

Then, the rotational speed of each of the rolls $1_1$, $1_2$ for the front wheels is detected by the respective speedometers 13. The detected signals are input to the monitor apparatus to compute and record the difference in rotational speed $\Delta V$ between the roll $1_2$ for the right front wheel and the roll $1_1$ for the left front wheel. The amount of change per unit time in the rotational speed of the roll $1_2$ for the right front wheel is also computed, and this amount of changes is recorded as an acceleration $\partial V$ of the roll $1_2$ for the right front wheel. Further, the detected signal of the torque meter 12 for that roll $1_1$ for the left front wheel whose rotation is restrained by the roll brake 14 is input to the monitor apparatus, and the torque T to operate on the roll $1_1$ is recorded.

Figure 3:
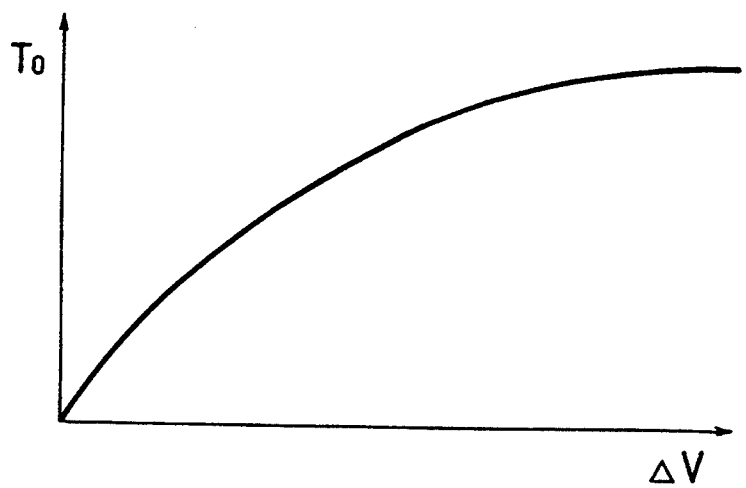
FIG. 3 is a graph showing operating characteristics of a limited slip differential.

When the limited slip differential is made up of a viscous coupling which is incorporated into the differential gear, a limited slip differential torque To as shown in FIG. 3 is expected to occur depending on the difference in rotational speed $\Delta V$. Let the torque to be distributed between the right and the left front wheels by the differential gear be Ta. Then, the transmission torque $T_1$ to be transmitted to the left front wheel is Ta+To, and the transmission torque $T_2$ to be transmitted to the right front wheel is Ta−To. Hence, the value To is $(T_1-T_2)/2$. Until the transmission torque $T_1$ exceeds the braking torque of the roll brake 14 and, consequently, the roll $1_1$ for the left front wheel starts to rotate, the torque T to operate on the roll $1_1$ remains equal to $T_1$. Accordingly, to obtain $T_1$, the torque on the restricted roll 1 is measured by the torquemeter 12 prior to the commencement of rotation of such roll. On the other hand, the transmission torque $T_2$ becomes equal to that acceleration torque of the right front wheel which can be obtained by multiplying the moment of inertia of the right front wheel inclusive of the roll $1_2$ for the right front wheel by acceleration $\partial V$ of the roll $1_2$. The limited slip differential torque To can therefore be obtained by the measured roll torque T of the roll $1_1$ for the left front wheel and the transmission torque $T_2$ to be calculated from the acceleration $\partial V$ of the roll $1_2$ for the right front wheel.

Figure 4:
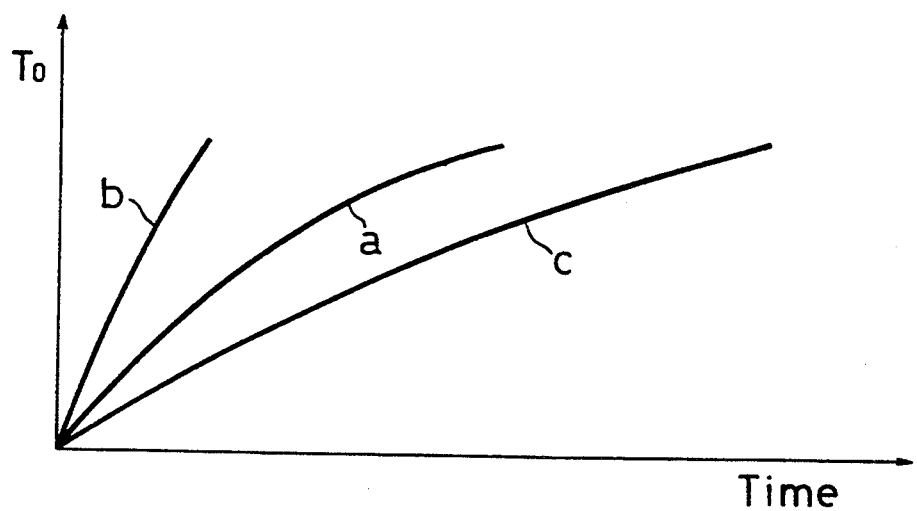
FIG. 4 is a graph showing changes in limited slip differential torque.

Since the difference $\Delta V$ in rotational speed varies with the degree of acceleration, the limited slip differential torque To varies like in curve "a" as shown in FIG. 4 in a standard acceleration. On the other hand, in a sudden acceleration, the rise in To becomes steeper like in curve "b" in the same figure and, in a gradual or gentle acceleration, the rise in To becomes gradual or less steep like in curve "c" in the same figure. Even when a standard acceleration is made, the rise in To also becomes steeper like in the curve "b" if inner plates and outer plates of the viscous coupling are in contact with each other. When, on the other hand, there is an oil leak in the viscous coupling, the rise in To becomes gradual like in the curve "c". It follows that, with the changes in To alone, it cannot be judged whether the changes in the torque are due to abnormalities in the viscous coupling or to variations in the degree of acceleration.

Figure 5:
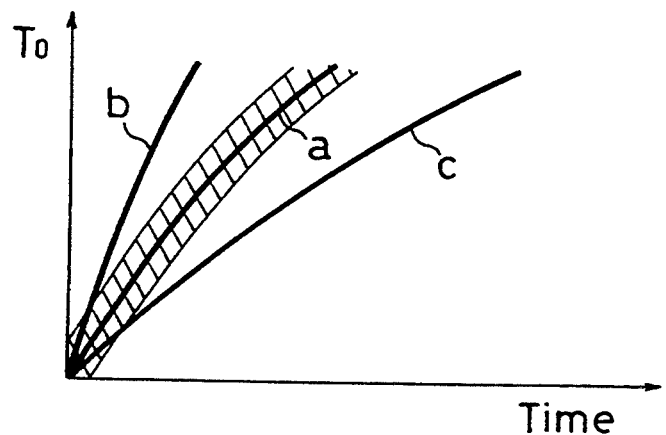
FIG. 5 is a graph showing the relationship between a standard value and measured value of the limited slip differential.

When the differential limiting torque To which corresponds to the difference $\Delta V$ in rotational speed measured during the accelerating operation is obtained based on the operation characteristics of the limited slip differential, i.e., the change characteristics of the differential limiting torque To in FIG. 3, the change characteristics of this torque To are like curve "a," curve "b," and curve "c" in FIG. 4 in a standard acceleration, sudden acceleration and gradual acceleration, respectively, as in the previously described pattern. Therefore, if the measured value of the limited slip differential torque T obtained as described above is compared with the torque To as a standard or reference value to see whether the measured value is within an allowable range or not, it becomes possible to accurately judge the acceptability or unacceptability of the operating conditions of the limited slip differential, i.e., whether or not there exist such abnormalities as contact of the inner and outer plates, oil leaks or the like in the limited slip differential. For example, in case where the standard value varies like in curve "a" in FIG. 5, if there is an abnormality in the form of contact of the inner and outer plates, the obtained value To will vary like in curve "b" in the same figure to lie above a hatched allowable range. If there is an abnormality in the form of oil leaks, the obtained value To will vary like in curve "c" in the same figure to lie below the allowable range. From these observations the presence or absence of abnormalities can be judged.

The change characteristics of the differential limiting torque To as shown in FIG. 3 are stored in the monitor apparatus in advance as a data map. After sampling the difference in rotational speed $\Delta V$, the acceleration $\partial V$ and the torque T, a standard value of the limited slip differential torque which corresponds to $\Delta V$ at each time of sampling is searched, and a comparison is made between the measured value of the limited slip differential torque which is obtained by the values T and $\partial V$ and the reference value. If the measured value is found to be within the allowable range, a judgement of acceptance is made and if it is found to be outside the allowable range, a judgement of unacceptance is made.

In the same manner as described above, an inspection can be made of a limited slip differential incorporated into a differential gear which is interposed between the right and the left rear wheels of a rear-wheel drive vehicle.

When an inspection is made of a limited slip differential which is provided between the front wheels and the rear wheels of a four-wheel drive vehicle, the following steps are followed. Namely, the clutches $4_1$, $4_2$ are engaged to connect together the rolls $1_1$, $1_2$ for the right and the left front wheels via the gear box 3. Also the clutches $6_1$, $6_2$ are engaged to connect together the rolls $2_1$, $2_2$ for the right and the left rear wheels via the gear box 5. On the other hand, the clutch 7 is disengaged to release the connection between the rolls for the front wheels and the rolls for the rear wheels. Further, the roll brake 14 for either the front wheels or the rear wheels, e.g., for the rear wheel $2_2$, is operated. Under these conditions, an accelerator pedal is depressed to perform the accelerating operation.

Then, using the speedometers 13, the rotational speeds of the rolls $1_1$, $1_2$ for the front wheels and the rotational speeds of the rolls $2_1$, $2_2$ for the rear wheels are detected, and the detected signals are input to the monitor apparatus. The difference in rotational speed $\Delta V$ between the rolls for the front wheels and the rolls for the rear wheels is computed and is recorded. The acceleration $\partial V$ of the rolls for the front wheels is also computed and is recorded. Further, the detected signal of the torque meter 12 for the roll $2_2$ for the rear wheels whose rotation is restrained by the roll brake 14 is input to the monitor apparatus, and the torque T which operates on the roll $2_2$ is recorded.

If the limited slip differential is normal, the torque ratio Tr/Tf between the torque Tr to be transmitted to the rear wheels and the torque Tf to be transmitted to the front wheels becomes a predetermined value which corresponds to the difference $\Delta V$ in rotational speed between the front wheels and the rear wheels. Until the roll for the rear wheels starts to rotate when the torque Tr exceeds the braking torque, the torque Tr remains equal to the torque T. Accordingly, to obtain $T_r$ the torque on the restricted roll $2_2$ is measured by the torquemeter 12 prior to the commencement of rotation of this roll. On the other hand, the torque Tf is equal to the acceleration torque which is the result of multiplying, by the value $\partial V$, the total moment of inertia of the right and the left front wheels inclusive of the rolls $1_1$, $1_2$ for the right and the left front wheels. Therefore, from the values T and $\partial V$ the torque ratio Tr/Tf can be obtained. Then, the measured value of the torque ratio and that standard value of the torque ratio which is generated at the measured difference in rotational speed ΔV are compared to make judgement whether the limited slip differential is acceptable or not.

By the way, in the above-described embodiment, the brake 14 is used as the means of restraining the rotation of the rolls $1_1$, $2_2$. However, the restraining of the rotation may also be effected by connecting a flywheel with a large inertial weight or a dynamo to the rolls $1_1$, $2_2$.

As can be seen from the above description, according to the present invention, a judgement can accurately be made as to whether or not the limited slip differential has been operated according to the predetermined operating characteristics irrespective of the degree of acceleration. Therefore, it can be accurately judged whether the limited slip differential is normal or not. This results in an improved reliability of the inspection of the limited slip differential.

It is readily apparent that the above-described method of inspecting a limited slip differential has the advantages of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of inspecting a limited slip differential which is incorporated into a differential gear for driving one wheel and the other wheel of a vehicle, said method comprising the steps of:

mounting said one wheel on one roll and said the other wheel on another roll;

accelerating said vehicle while said one roll on which said one wheel is mounted is being subjected to a force of restraining the rotation of said one roll;

measuring, during said accelerating step, a difference in rotational speed between said one roll and said another roll on which said the other wheel is mounted;

measuring a torque which operates on said one roll;

obtaining from said measured torque a limited slip differential torque which is generated by said limited slip differential; and comparing a standard value of said limited slip differential torque, which is generated at said measured difference in rotational speed, and said obtained limited slip differential torque, whereby a judgement is made whether said limited slip differential is acceptable or not.

2. A method of inspecting a limited slip differential according to claim 1, wherein said one wheel and said the other wheel constitute the right and the left front wheels of a front-wheel drive vehicle.

3. A method of inspecting a limited slip differential according to claim 1, wherein said one wheel and said the other wheel constitute the right and the left rear wheels of a rear-wheel drive vehicle.

4. A method of inspecting a limited slip differential according to claim 1, wherein said step of obtaining said limited slip differential comprises the steps of:

measuring an acceleration of said the other roll;

computing from said measured acceleration a transmission torque to be transmitted to said the other wheel; and deducting said transmission torque from said measured value of said torque which operates on said one roll.

5. A method of inspecting a limited slip differential which is provided between front wheels and rear wheels of a four-wheel drive vehicle, said method comprising the steps of:

mounting said front wheels or said rear wheels on one roll and the remaining of said front wheels and said rear wheels on another roll, respectively;

accelerating said vehicle while said one roll on which one or the other of said front wheels and said rear wheels are mounted is being subjected to a force of restraining the rotation of said one roll;

measuring, during said accelerating step, a difference in rotational speed between said one roll and said another roll on which the remaining of said front wheels and said rear wheels are mounted;

measuring a torque which operates on said one roll;

obtaining from said measured torque a torque ratio between a transmission torque to be transmitted to either said front wheels or said rear wheels and a transmission torque to be transmitted to the remaining of said front wheels and said rear wheels; and comparing a standard value of torque ratio, which is generated at said measured difference in rotational speed, and said obtained torque ratio, whereby a judgement is made whether said limited slip differential is acceptable or not.

6. A method of inspecting a limited slip differential according to claim 5, wherein said one roll comprises a set of right and left rolls for mounting thereon the right and the left front wheels, respectively, and said another roll comprises a set of right and left rolls for mounting thereon the right and the left rear wheels, respectively.

7. A method of inspecting a limited slip differential according to claim 5, wherein said step of obtaining said torque ratio comprises the steps of:

measuring an acceleration of said another roll;

computing from said measured acceleration a transmission torque to be transmitted to the remaining of said front wheels and said rear wheels; and obtaining said torque ratio from said measured value of said torque which operates on said one roll and said computed transmission torque to be transmitted to the remaining of said front wheels and the rear wheels.

* * * * *